United States Patent Office 3,040,014
Patented June 19, 1962

3,040,014
MELT INDEX AND BRITTLENESS OF POLYPROPYLENE
John R. Lovett, Metuchen, and Joseph M. Kelley, Jr., Westfield, N.J., assignors to Esso Research and Engineering Company, a corporation of Delaware
No Drawing. Filed May 27, 1959, Ser. No. 816,044
1 Claim. (Cl. 260—93.7)

This invention relates to a method of improving the product molecular weight, tear resistance, melt index and brittleness temperature in the low pressure polymerization of propylene. More particularly, it relates to a process of this nature wherein these results are obtained by polymerizing propylene in the presence of small amounts of both hydrogen and ethylene.

In the recent past so-called "low pressure" solid polypropylene has been attracting increasing attention as a plastic competitive with polyethylene. This polymer has been prepared by the now well-known process of polymerizing propylene with catalyst systems made up of reducible, heavy, transition metal compounds and a reducing metal-containing compound to high density, isotactic, high molecular weight, solid, relatively linear products, e.g. see Belgian Patent 538,782, and "Scientific American," September 1957, pages 98 et seq. One of the problems encountered in the process is that of controlling the molecular weight of the product. In the absence of any control these processes frequently produce polymers of a molecular weight so high and a melt index so low, as to preclude the use of the polymer in many important applications. The melt index of the polymer at a given melt temperature is known to be determined by the molecular weight of the polymer, e.g. a polymer with a higher molecular weight being less fluid than one with a lower molecular weight. A standard measure of the melt flow of the polymer is the melt index test, described in detail in ASTM-D-1238-52-T. A molecular weight expressed in terms of intrinsic viscosity (measured in tetralin @ 125° C.) of more than 4.0 is usually considered undesirable.

It has therefore been proposed to utilize hydrogen with the feed in the low pressure polymerization of propylene to control the molecular weight. The use of hydrogen on the other hand results in an undue increase in polymer brittleness which limits the utility of the product as a packaging material for frozen foods, wire and cable insulation, plastic pipes, etc. Low temperature brittleness is commonly measured by the Bell Brittleness Temperature Test (ASTM Test D-746 modified in that the distance (striker bar to clamp) was .180 inch instead of .250). Contrary to the beliefs of some experts, the polypropylene product obtained by the use of hydrogen has an increased degree of crystallinity which in turn appears to be related to the undesirable complications introduced.

It has now been found that polypropylene of improved melt index and low temperature brittleness is obtained by polymerizing propylene with the indicated catalysts in the presence of small amounts of both hydrogen and ethylene.

The hydrogen is utilized in an amount of from 10 to 400 p.p.m. by weight (on propylene) and the ethylene is utilized in an amount of 0.5 to 6.0 vol. percent based on propylene.

These improvements are obtained with little sacrifice in other properties.

The ethylene and propylene prior to passage to the polymerization process are preferably purified of catalyst poisons such as water, carbon monoxide, acetylenes and the like by passage through a bed of barium oxide, alumina and/or through aluminum alkyls (e.g. aluminum triethyl).

In the process the polymers are prepared by polymerizing the system with the aid of certain polymerization catalysts. The catalysts are solid, insoluble, reaction products obtained by partially reducing a heavy metal compound of a Group IV-B, V-B and VI-B metal of the periodic system, such as vanadium tetrachloride or a titanium halide, e.g. $TiCl_4$, $TiBr_4$, etc., preferably with metallic aluminum. The preferred catalyst of this type is usually prepared by reducing 1 mole of titanium tetrahalide, usually tetrachloride, with about one-third mole of aluminum to give a material corresponding to $TiCl_3 \cdot 0.33AlCl_3$, thus containing cocrystallized $AlCl_3$. (For further details see copending U.S. application, Serial No. 578,198, filed April 6, 1956, and Serial No. 766,376, filed October 19,1958.) The product is then activated with an aluminum alkyl compound corresponding to the formula RR'AlX. In this formula R, R' and X preferably are alkyl groups of 2 to 8 carbon atoms, although X may alternatively be hydrogen or a halogen, notably chlorine. Typical examples of the aluminum alkyl compounds are aluminum triethyl, aluminum sesquichloride, aluminum triisobutyl, etc.

The aluminum reduced titanium tetrachloride or other transition metal halides can be dried and partially activated in a fluid jet mill.

The propylene is then contacted with the resulting catalyst in the presence of an inert hydrocarbon solvent such as isopentane, n-heptane, xylene, etc. The polymerization is conveniently effected at temperatures of about 0° to 100° C. and pressures ranging from about 0 to 500 p.s.i.g., usually 0 to 100 p.s.i.g. The catalyst concentration in the polymerization zone is preferably in the range of about 0.03 to 0.5 wt. percent based on total liquid and the polymer product concentration in the polymerization zone is preferably kept between about 2 to 15 wt. percent based on total solids content so as to allow easy handling of the polymerized mixture. The proper polymer concentration can be obtained by having enough of the inert diluent present or by stopping the polymerization short of 100% conversion of the monomers. Hydrogen and ethylene are injected into the reaction zone together with the propylene or separately. During actual operation the melt index desired for any given sample is determined. This can be obtained from empirical data on the proper amount of hydrogen required. The desired brittleness temperature is then also gotten by the proper selection of the amounts of ethylene which is also readily determined empirically. Nomographs can be prepared utilizing these variables so as to obtain a "tailor-made" product.

When the desired degree of polymerization has been reached, a $C_1$ to $C_8$ alkanol such as methyl alcohol, isopropyl alcohol or n-butyl alcohol, desirably in combination with a chelating agent for polymer deashing such as acetylacetone is normally added to the reaction mixture for the purpose of dissolving and deactivating the catalyst and for precipitating the polymer product from solution. After filtration, the solid polymer may be further washed with water, alcohol or acid, such as hydrochloric acid, dried, compacted and packaged.

It is to be understood that the term "low pressure" polymer as used herein connotes material prepared in the indicated manner.

This invention and its advantages will be better understood by reference to the following example.

EXAMPLE

Polypropylene was prepared with a catalyst system made up of $TiCl_3 \cdot 0.33AlCl_3$ and aluminum triethyl with an aluminum (alkyl) to titanium trichloride ratio of 2:1.

Varying amounts of hydrogen and ethylene were injected with the feed and the results of a large number of polymerizations are tabulated below.

*Effect of $H_2$ Plus Ethylene in Propylene Feed*

| $H_2$ p.p.m. wt. | $C_2$-Vol. percent | Rate w./hr./w. | Tensile Strength, p.s.i. | Density, g./cc. | M.I. at [1] 190° C. | Brittleness Temp., °F. |
|---|---|---|---|---|---|---|
| 0 | 0 | 107 | 4,000 | 0.8973 | 0.45 | 65 |
| 220 | 0 | 100 | 5,336 | 0.9004 | 6.9 | 115 |
| 175 | 2 | 90 | 3,500 | 0.8949 | 2.8 | 55 |
| 200 | 6 | 105 | 2,170 | 0.8878 | 1.0 | 15 |
| 320 | 0 | 72 | 4,981 | 0.9006 | 10.9 | 160+ |
| 390 | 2 | 90 | 3,755 | 0.8958 | 4.0 | 60 |
| 380 | 3 | 99 | 3,080 | 0.8934 | 5.5 | 45 |

[1] Tensiles and Melt Indexes rounded off to nearest zero.

These data show how the melt index was increased more than 10-fold and the Bell brittleness temperature markedly reduced by the process of this invention.

The products obtained have a minimum melt index of 1.0 at 190° C. and a maximum Bell brittleness temperature of 18° C. as defined.

The advantages of this invention will be apparent to those skilled in the art. Products of good melt index, brittleness and tensile strength are obtained. The more serious problems in the polypropylene product are substantially eliminated. Higher rates of polymerization are obtained.

It is to be understood that this invention is not limited to the specific examples which have been offered merely as illustrations and that modifications may be made without departing from the spirit of the invention.

What is claimed is:

A process for polymerizing propylene so as to obtain a solid polymer product having a minimum melt index of about 1.0 at 190° C. and decreased low temperature brittleness which comprises polymerizing the propylene feed with a catalyst system of titanium trichloride containing cocrystallized $AlCl_3$, prepared by the reduction of titanium tetrachloride with aluminum, and aluminum triethyl in the presence of from 10 to 400 p.p.m. by weight of hydrogen and 0.5 to 6.0 volume percent of ethylene, based on propylene.

References Cited in the file of this patent

UNITED STATES PATENTS

| 2,899,413 | Hagemeyer | Aug. 11, 1959 |
| 2,914,915 | Stuart | Nov. 24, 1959 |

FOREIGN PATENTS

| 538,782 | Belgium | Dec. 6, 1955 |
| 783,487 | Great Britain | Sept. 25, 1957 |
| 785,314 | Great Britain | Oct. 23, 1957 |

OTHER REFERENCES

Renfrew: "Polythene," June 13, 1957, Iliffe & Sons, Ltd., pp. 168–169.

Gaylord: Linear and Stereoregular Addition Polymers, Interscience (N.Y., 1959), pp. 120, 121, 130–132.